United States Patent
Hou et al.

(10) Patent No.: US 12,446,504 B2
(45) Date of Patent: Oct. 21, 2025

(54) METHOD FOR ACTIVATING CROP SEED BY HIGH-VOLTAGE ELECTRIC FIELD COLD PLASMA (HVCP), AND USE THEREOF

(71) Applicants: Nanjing Suman Plasma ERI. Co., Ltd., Jiangsu (CN); NJ Tianliang Bioengineering Technology Co., Ltd., Jiangsu (CN); NANJING AGRICULTURAL UNIVERSITY, Jiangsu (CN)

(72) Inventors: Xilin Hou, Nanjing (CN); Dong Xiao, Nanjing (CN); Ying He, Nanjing (CN); Ying Li, Nanjing (CN); Jianhao Zhang, Nanjing (CN); Jinglin Wan, Nanjing (CN)

(73) Assignees: Nanjing Suman Plasma ERI. Co., Ltd., Jiangsu (CN); NJ Tianliang Bioengineering Technology Co., Ltd., Jiangsu (CN); NANJING AGRICULTURAL UNIVERSITY, Jiangsu (CN)

( * ) Notice: Subject to any disclaimer, the term of this patent is extended or adjusted under 35 U.S.C. 154(b) by 0 days.

(21) Appl. No.: 18/548,796

(22) PCT Filed: Dec. 5, 2022

(86) PCT No.: PCT/CN2022/136448
§ 371 (c)(1),
(2) Date: Sep. 1, 2023

(87) PCT Pub. No.: WO2024/045393
PCT Pub. Date: Mar. 7, 2024

(65) Prior Publication Data
US 2025/0024801 A1    Jan. 23, 2025

(30) Foreign Application Priority Data
Sep. 1, 2022   (CN) .......................... 202211066284.5

(51) Int. Cl.
| | | |
|---|---|---|
| *A01H 1/06* | (2006.01) | |
| *A01C 1/00* | (2006.01) | |
| *A01H 5/10* | (2018.01) | |
| *A01H 6/20* | (2018.01) | |

(52) U.S. Cl.
CPC ................. *A01H 1/06* (2013.01); *A01C 1/00* (2013.01); *A01H 5/10* (2013.01); *A01H 6/20* (2018.05)

(58) Field of Classification Search
None
See application file for complete search history.

(56) References Cited

FOREIGN PATENT DOCUMENTS

| CN | 101669416 | A | | 3/2010 |
|---|---|---|---|---|
| CN | 104620719 | A | | 5/2015 |
| CN | 104782266 | A | | 7/2015 |
| CN | 109041651 | A | | 12/2018 |
| CN | 113475393 | A | * | 10/2021 |
| RU | 2732590 | C1 | | 9/2020 |

OTHER PUBLICATIONS

Shakuntala, N. et al., (Studies on standardization of water soaking duration on seed quality in cucumber (*Cucumis sativus* L.) seeds 2020. Phytojournal. (Year: 2020).*
Wang, Yuan et al., (Effect of Plasma and Electrostatic Field on the Growth and Nutrients of Chinese Cabbage. 2022. IEEE Transactions on Plasma Science. 50. 1-6. 10.1109/TPS.2022.3158931) (Year: 2022).*
Barman, P.D., et al., (Survey on the potential impact of high voltage transmission lines on the growth characteristics of plants. 2015 International Journal on Environmental Sciences, 6, 219-224. (Year: 2015).*
International Search Report dated May 26, 2023, in PCT/CN2022/136448.
Wang et al., "Effect of low-temperature plasma treatment on brown rice seed's growth vigor and analysis via near-infrared spectroscopy," Jan. 2018, vol. 42, No. 1, Journal of Anhui University (Natural Science Edition) doi:10.3969/j.issn. 1000-2162.2018.01.012.
Yang et al., "Effects of Nonthermal Processing Technologies on Seed Germination: a Review on Recent Research Advances," 2020, vol. 41, No. 7, 1994-2023 China Academic Journal Electronic Publishing House http://www.cnki.net.
Yu et al., "Research Progress of High-Pressure Treatment Technology in Fresh-Cut Fruits and Vegetables Preservation," 2020, vol. 41, No. 7, 1994-2023 China Academic Journal Electronic Publishing House http://www.cnki.net.

* cited by examiner

*Primary Examiner* — Phuong T Bui
*Assistant Examiner* — Christian Jose Ordaz
(74) *Attorney, Agent, or Firm* — Procopio, Cory, Hargreaves & Savitch LLP

(57) ABSTRACT

The present disclosure relates to a method for activating a crop seed by high-voltage electric field cold plasma (HVCP), and use thereof, belonging to the technical field of crop planting. The present disclosure provides a method for activating a crop seed by HVCP, including the following steps: (1) mixing a crop seed with water and immersing the crop seed in water for 4 h to 24 h to obtain an immersed crop seed; and (2) conducting discharge activation on the immersed crop seed at a voltage of 80 kV to 130 kV to obtain an activated crop seed. In the present disclosure, the method can improve heat-resistant and disease-resistant properties of crops, and provide a scientific basis for subsequent acquisition of excellent seeds.

8 Claims, 3 Drawing Sheets

Specification includes a Sequence Listing.

METHOD FOR ACTIVATING CROP SEED BY HIGH-VOLTAGE ELECTRIC FIELD COLD PLASMA (HVCP), AND USE THEREOF

CROSS REFERENCE TO RELATED APPLICATION

The present application is a national stage application of International Patent Application NO. PCT/CN2022/136448, filed on Dec. 5, 2022, which claims priority of the Chinese Patent Application No. 2022110662845, filed with the China National Intellectual Property Administration (CNIPA) on Sep. 1, 2022, and entitled "METHOD FOR ACTIVATING CROP SEED BY HIGH-VOLTAGE ELECTRIC FIELD COLD PLASMA (HVCP), AND USE THEREOF", both of which are incorporated by references in their entities.

REFERENCE TO SEQUENCE LISTING

A computer readable XML file entitled "HLPCTP20230503179", that was created on Jul. 21, 2023, with a file size of about 16,730 bytes, contains the sequence listing for this application, has been filed with this application, and is hereby incorporated by reference in its entirety.

TECHNICAL FIELD

The present disclosure relates to the technical field of crop planting, in particular to a method for activating a crop seed by high-voltage electric field cold plasma (HVCP), and use thereof.

BACKGROUND

*Brassica campestris* ssp. *chinensis* Makino is a kind of cabbage crops that originated in China, and belongs to Brassicaceae, Cruciferae, alias Chinese cabbage, cabbage, rape, etc. This crop has a high nutritional value, is widely cultivated in various parts of China, especially in the middle and lower reaches of the Yangtze River, and is highly popular among consumers. In recent years, due to the unilateral pursuit of high-yield and intensive breeding of varieties, the genetic background of breeding materials has become increasingly narrow; and the genetic basis of planting varieties tends to be single. This is mainly reflected in the lack of excellent genes and the genetic vulnerability to adverse environmental factors. As a result, the breeding of new varieties for the *Brassica campestris* ssp. *chinensis* Makino has encountered great technical bottlenecks, and is even stagnated. It has become a major problem for breeders to deal with the current severe situations. The acquisition of a crop with excellent resistance to adversity requires the construction of a mutant library with a certain scale and a large amount of genetically-diverse variation materials. Excellent crops can be obtained only in this way.

With the improvement of people's living standards, the market demand has undergone great changes. In order to improve the breeding efficiency of *Brassica campestris* ssp. *chinensis* Makino, or endow this crop with excellent, high-yielding, and characteristic functional qualities, it is necessary to conduct mutagenesis through physical and chemical methods or induce mutations through molecular biology techniques to generate new germplasms. At present, the cultivation of new varieties for *Brassica campestris* ssp. *chinensis* Makino is mainly based on hybrid breeding and male sterile lines. These measures show long breeding cycle and low efficiency, which hinder the breeding progress of the *Brassica campestris* ssp. *chinensis* Makino. Moreover, due to a similar genetic background of the varieties in *Brassica campestris* ssp. *chinensis* Makino, it is difficult to breed new excellent varieties. Accordingly, it has always been a scientific problem in the breeding of *Brassica campestris* ssp. *chinensis* Makino to quickly create new germplasms.

SUMMARY

An objective of the present disclosure is to provide a method for activating a crop seed by HVCP, and use thereof.

To achieve the above objective, the present disclosure provides the following technical solutions:

The present disclosure provides a method for activating a crop seed by HVCP, including the following steps:
(1) mixing the crop seed with water and immersing the crop seed in water for 4 h to 24 h to obtain an immersed crop seed; and
(2) conducting discharge activation on the immersed crop seed at a voltage of 80 kV to 130 kV.

Preferably, the crop seed is derived from a crop selected from the group consisting of rice, wheat, corn, rapeseed, soybean, tomato, chili, eggplant, cucumber, muskmelon, pumpkin, kidney bean, radish, *Brassica oleracea, Brassica juncea*, Chinese cabbage, and watercress.

Preferably, the mixing of crop seed with water is conducted at a mass-to-volume ratio of 1:(4-6).

Preferably, the immersing is conducted in the dark; and the immersing is conducted at a water temperature of 18° C. to 22° C.

Preferably, the discharge activation is conducted for 0.5 h to 10 h; and
the discharge activation is conducted at 18° C. to 25° C.

The present disclosure further provides use of the method in improving a yield and heat resistance of a crop.

The present disclosure further provides use of the method in mutation breeding.

The present disclosure further provides a method for mutagenizing a crop seed by HVCP, including the following steps:
(1) mixing the crop seed with water and immersing the crop seed in water for 4 h to 24 h to obtain an immersed crop seed; and
(2) conducting discharge activation on the immersed crop seed at a voltage of 80 kV to 130 kV.

Preferably, the mixing of crop seed with water is conducted at a mass-to-volume ratio of 1:(4-6):
the immersing is conducted in the dark:
the immersing is conducted at a water temperature of 18° C. to 22° C.:
preferably, the discharge activation is conducted for 0.5 h to 10 h; and
the discharge activation is conducted at 18° C. to 25° C.

The present disclosure provides a method for activating a crop seed by HVCP, and use thereof.

In the present disclosure, the method can improve a yield and heat resistance of a crop, and can also prolong a flowering period. The HVCP refers to a highly ionized gas cloud generated by gas under the action of a strong electromagnetic field. The highly ionized gas cloud is an ionized gas-like substance composed of atoms deprived of some electrons as well as positive and negative electrons generated after the atoms are ionized. The highly ionized gas cloud presents a highly-excited unstable state, and is the fourth state of a matter. The method is a physical method, with convenient use, safety, and high effective mutation rate.

In the present disclosure, more positive mutants (16.5%) can be obtained by inducing water-swelling seeds through the HVCP. Compared with chemical mutagenesis by ethyl methanesulfonate (EMS), plasma mutagenesis has a higher efficiency in obtaining forward mutant strains in the $M_0$ generation. This method provides a new approach for the construction of mutants and the germplasm creation of crops and vegetables. The principle of obtaining a high induction success rate lies in: a medium around the seed can generate photoelectrons, ions, and active free radicals to cause high-intensity genetic material loss to seed cells: further, with a high fault-tolerant repair mechanism of the SOS response started by cells, a variety of mismatch sites are generated. Finally, mutant strains are formed with stable genetics and abundant species.

The method has shorter mutagenesis period, lower cost, and easy access to more positive mutants than those of other existing technologies. The whole operation is simple, safe, and pollution-free.

DETAILED DESCRIPTION OF THE EMBODIMENTS

Figure 1:
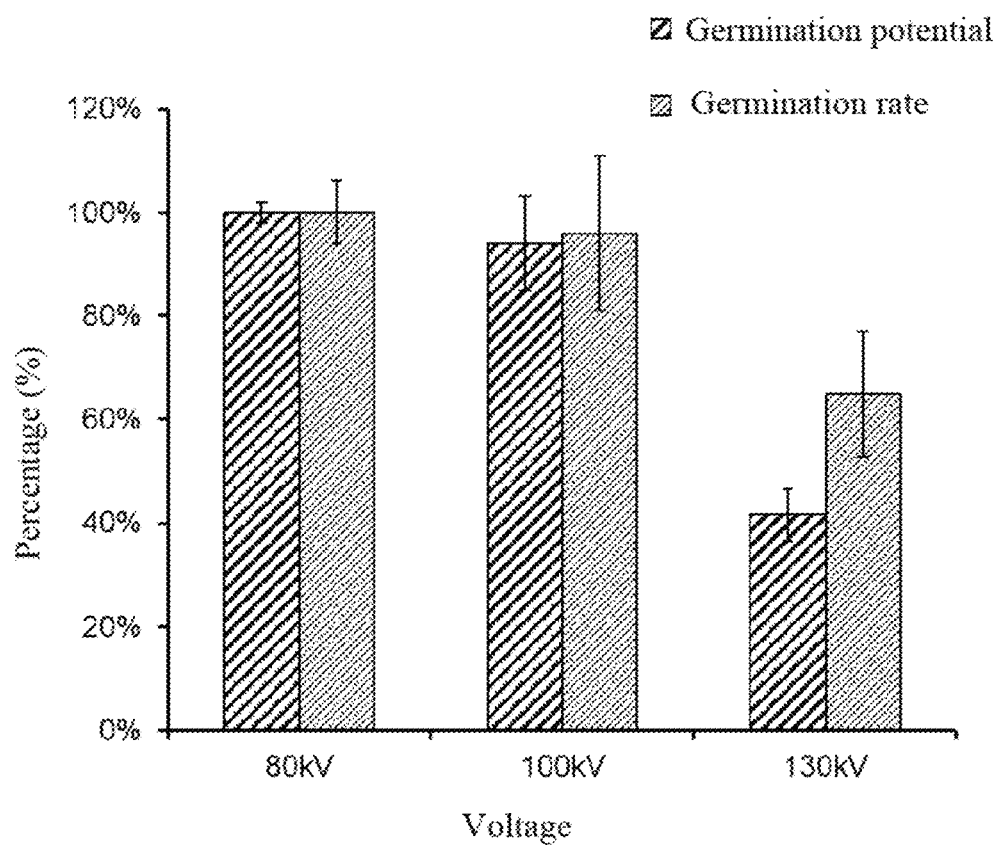
FIG. 1 shows an influence of different voltages on seed germination rate and germination potential of *Brassica campestris* ssp. *chinensis* Makino.

The present disclosure provides a method for activating a crop seed by HVCP, including the following steps:
(1) a crop seed is mixed with water and immersed in water for 4 h to 24 h to obtain an immersed crop seed; and
(2) the immersed crop seed is discharged to activate at a voltage of 80 kV to 130 kV.

In the present disclosure, the crop seed is preferably derived from a crop selected from the group consisting of rice, wheat, corn, rapeseed, soy bean, tomato, chili, eggplant, cucumber, muskmelon, pumpkin, kidney bean, radish, *Brassica oleracea, Brassica juncea*, Chinese cabbage, and watercress, more preferably *Brassica campestris* ssp. *chinensis* Makino. The crop seed is mixed with water at a mass-to-volume ratio of preferably 1:(4-6), more preferably 1:5.

In the present disclosure, the crop seed is immersed preferably in the dark at a water temperature of preferably 18° C. to 22° C., more preferably 20° C. for preferably 8 h to 20 h, more preferably 14 h.

In the present disclosure, the voltage is preferably 105 kV. The immersed crop seed is discharged to activate at preferably 18° C. to 25° C., more preferably 21.5° C. for preferably 0.5 h to 10 h, more preferably 3.5 h to 7 h, and even more preferably 5.25 h.

The present disclosure further provides use of the method in improving a yield and heat resistance of a crop.

The present disclosure further provides use of the method in mutation breeding.

The present disclosure further provides a method for mutagenizing a crop seed by HVCP, including the following steps:
(1) a crop seed is mixed with water and immersed in water for 4 h to 24 h to obtain an immersed crop seed; and
(2) the immersed crop seed is discharged to activate at a voltage of 80 kV to 130 kV to obtain a mutagenized crop seed.

In the present disclosure, the crop seed is preferably derived from a crop selected from the group consisting of rice, wheat, corn, rapeseed, soy bean, tomato, chili, eggplant, cucumber, muskmelon, pumpkin, kidney bean, radish, *Brassica oleracea, Brassica juncea*, Chinese cabbage, and watercress, more preferably *Brassica campestris* ssp. *chinensis* Makino. In the present disclosure, the crop seed is mixed with water at a mass-to-volume ratio of preferably 1:(4-6), more preferably 1:5: the crop seed is immersed preferably in the dark at a water temperature of preferably 18° C. to 22° C., more preferably 20° C. for preferably 8 h to 20 h, more preferably 14 h.

In the present disclosure, the voltage is preferably 105 kV. The immersed crop seed is discharged to activate at preferably 18° C. to 25° C., more preferably 21.5° C. for preferably 0.5 h to 10 h, more preferably 3.5 h to 7 h, and even more preferably 5.25 h.

The technical solutions provided by the present disclosure will be described in detail below with reference to examples, but the examples should not be construed as limiting the claimed scope of the present disclosure.

In these examples, a *Brassica campestris* ssp. *chinensis* Makino cultivar, 'Suzhouqing', is selected as the material for experiment.

In these examples of the present disclosure, germination rate=(number of germinated seeds/number of tested seeds)× 100%, which is counted on day 7 of accelerating germination:

germination potential=(number of germinated seeds/number of tested seeds)×100%, which is counted on day 3 of accelerating germination; and survival rate=(number of surviving plants/total number of plants)×100%, which is counted on day 30 after planting.

Example 1

A *Brassica campestris* ssp. *chinensis* Makino material 'Suzhouqing' was selected to use, and its seeds were added to a petri dish with water at a mass-to-volume ratio of 1:5, and subjected to a water absorption in the dark at 20° C. for 8 h to obtain immersed seeds.

The immersed seeds were randomly divided into 3 groups. The first group was discharged to activate at a voltage of 80 kV. The second group was discharged to activate at a voltage of 100 kV. The third group was discharged to activate at a voltage of 130 kV. The three groups of seeds were all discharged to activate at 20° C. for 4 h, to obtain activated seeds.

In each group. 50 activated seeds were selected and cultured for 3 d at 20° C. in 16 h light/8 h dark. The germination potential of the activated seeds in each group was counted, and the germination rate of the activated seeds in each group was counted on the 7th day. The results were shown in FIG. 1.

As shown in FIG. 1, under different voltage treatments, the germination rate and germination potential of seeds swelled by water absorption for 8 h at 80 kV and 100 kV had no obvious change. As the treatment voltage increased, when the voltage reached 130 kV, the germination rate and the germination potential were significantly inhibited, which were down to 40% and 65%, respectively. The results revealed that the inhibition of germination rate and germination potential of *Brassica campestris* ssp. *chinensis* Makino induced by HVCP had the most obvious effectiveness when the treatment voltage was 130 kV.

Example 2

A *Brassica campestris* ssp. *chinensis* Makino material 'Suzhouqing' was selected to use, and its seeds were added to a petri dish with water at a mass-to-volume ratio of 1:5, and subjected to a water absorption in the dark at 20° C. for 8 h to obtain immersed seeds.

After germinated seeds were discarded, the immersed seeds were divided into 10 groups. The first group was discharged to activate for 0.5 h at a constant peak voltage of 130 kV. The second group was discharged to activate for 1 h at a constant peak voltage of 130 kV. The third group was discharged to activate for 1.5 h at a constant peak voltage of 130 kV. The fourth group was discharged to activate for 2 h at a constant peak voltage of 130 kV. The fifth group was discharged to activate for 3 h at a constant peak voltage of 130 kV. The sixth group was discharged to activate for 4 h at a constant peak voltage of 130 kV. The seventh group was discharged to activate for 5 h at a constant peak voltage of 130 kV. The eighth group was discharged to activate for 6 h at a constant peak voltage of 130 kV. The ninth group was discharged to activate for 8 h at a constant peak voltage of 130 kV. The tenth group was discharged to activate for 10 h at a constant peak voltage of 130 kV. The ten groups of seeds were all discharged to activate at 20° C. Seeds without activation were used as a control.

In each group, 50 seeds were selected and cultured for 3 d at 20° C. in 16 h light/8 h dark. The germination potential of the seeds in each group was counted, and a germination rate of the seeds in each group was counted on the 7th day. The results are shown in FIG. 2.

Figure 2:
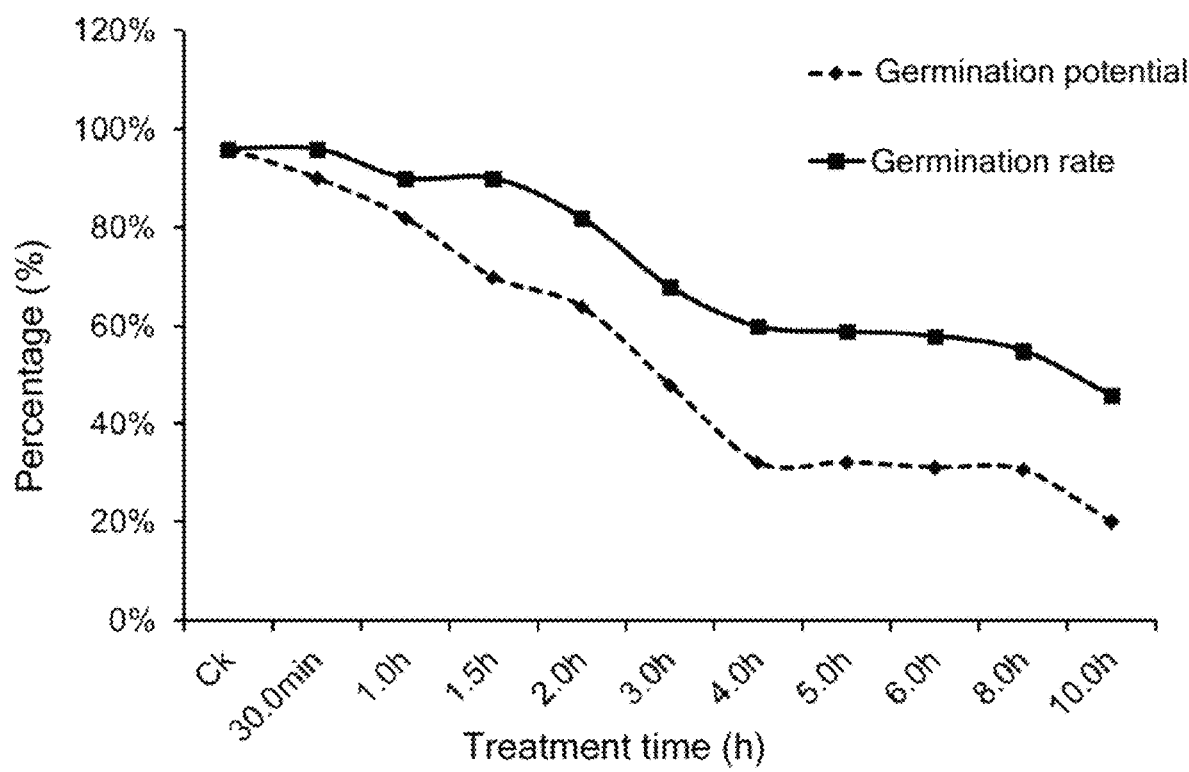
FIG. 2 shows an influence of different treatment times on seed germination rate and germination potential of *Brassica campestris* ssp. *chinensis* Makino.

As shown in FIG. 2, compared with the control, with the prolongation of treatment time, both germination rate and germination potential were inhibited. The germination rate and germination potential were rapidly inhibited at 2 h to 4 h of treatment, where the germination rate decreased from 82% (2 h) to 60% (4 h), and the germination potential decreased from 64% (2 h) to 32% (4 h), and then tended to be stable. The results revealed that the inhibition of germination rate and germination potential of *Brassica campestris* ssp. *chinensis* Makino induced by HVCP were obvious effected when the treatment time was 2 h to 4 h.

Example 3

A *Brassica campestris* ssp. *chinensis* Makino material 'Suzhouqing' was selected to use, and its seeds were added to a petri dish with water at a mass-to-volume ratio of 1:4, and subjected to a water absorption in the dark at 20° C. for 8 h to obtain immersed seeds.

After germinated seeds were discarded, the immersed seeds were divided into 10 groups. The first group was discharged to activate for 0.5 h at a constant peak voltage of 130 kV. The second group was discharged to activate for 1 h at a constant peak voltage of 130 kV. The third group was discharged to activate for 1.5 h at a constant peak voltage of 130 kV. The fourth group was discharged to activate for 2 h at a constant peak voltage of 130 kV. The fifth group was discharged to activate for 3 h at a constant peak voltage of 130 kV. The sixth group was discharged to activate for 4 h at a constant peak voltage of 130 kV. The seventh group was discharged to activate for 5 h at a constant peak voltage of 130 kV. The eighth group was discharged to activate for 6 h at a constant peak voltage of 130 kV. The ninth group was discharged to activate for 8 h at a constant peak voltage of 130 kV. The tenth group was discharged to activate for 10 h at a constant peak voltage of 130 kV. The ten groups of seeds were all discharged to activate at 20° C. Seeds without activation were used as a control group.

In each group, 200 seeds were selected to be sown in plug trays, and grown under 16 h light/20° C., and 8 h dark/16° C. After 26 d of cultivation, seedlings were planted in the field and subjected to field management according to conventional methods. A survival rate of the seedlings was counted separately after 30 d, 60 d, and 90 d of planting in the field. The results were shown in FIG. 3.

Figure 3:
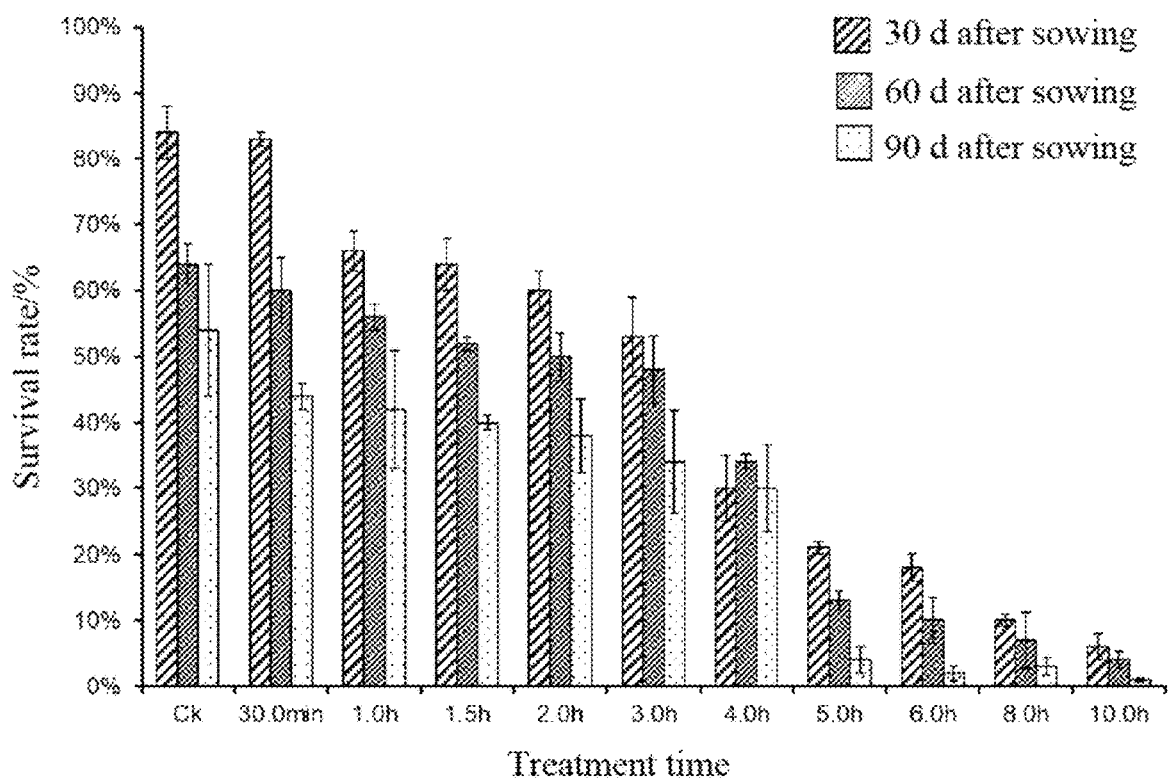
FIG. 3 shows an influence of different treatment times on seed survival rate of *Brassica campestris* ssp. *chinensis* Makino.

As shown in FIG. 3, compared with the control, with the prolongation of treatment time, the survival rate showed a downward trend. The decrease in the survival rate was more obvious at 2 h to 4 h of treatment. The survival rate of 30 d of planting decreased from 60% (2 h) to 30% (4 h), the survival rate of 60 d of planting decreased from 50% (2 h) to 34% (4 h), and the survival rate of 90 d of planting decreased from 38% (2 h) to 30% (4 h), and then the survival rate was even lower. The results revealed that HVCP could inhibit the survival rate of *Brassica campestris* ssp. *chinensis* Makino. The treatment for 2 h to 4 h was appropriate, which could ensure the survival rate reaching 50% (30 d after planting), creating mutants, producing more forward mutants up to 16.5%.

Example 4

After the plants in each group of Example 3 were planted for 30 d, the growth and development of plants in each group were investigated.

Figure 4:
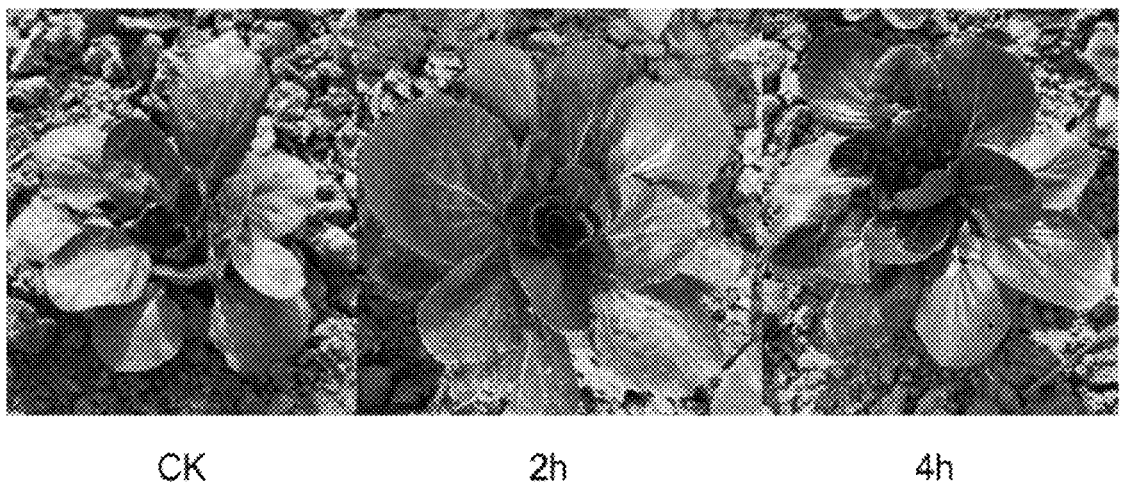
FIG. 4 shows the acquisition of forward mutant plants.

Results: a variety of mutants with positive and negative traits were observed in the plots treated with high-pressure plasma for 2 h and 4 h. There were 33 plants showing better plant type, disease resistance, leaf color (darkness), and heat resistance than those of the control. In addition, there were more reverse mutants in the 2 h treatment group, and the forward mutants did not receive seeds due to weak disease resistance. The results of the obtained forward mutant strains were shown in FIG. 4.

Example 5

9 SSR markers (including BeVIN3_A02. BeAGL24_A01. BeFRI_A03. BeFLC5_A03. BcFLC1_A10, BeFLC2_A02. BeAGL24_A03. BeFT_A02, and BeFLM_A08) closely linked to candidate genes regulating flowering time in temperature pathway were used. The DNAs of control CK, mutant strain $M_0$ (generation 0), and mutant strain $M_1$ (generation 1) were used as templates, and polymorphisms were detected with polyacrylamide. To amplify BeVIN3_A02, a forward primer was: 5'-CCACCAGAACTGGCTCTCAT-3' (SEQ ID NO: 1), and a reverse primer was: 5'-GAGGGAGGACCTGGAGTTGT-3' (SEQ ID NO: 2). To amplify BcAGL24_A01, a forward primer was: 5'-TCTTTGTGATGCCGATGTTG-3' (SEQ ID NO: 3), and a reverse primer was: 5'-GATATCTC-CAAGCCCGAGAA-3' (SEQ ID NO: 4). To amplify BeFRI_A03, a forward primer was: 5'-CTGA-TACTGCTGCTCCATCG-3' (SEQ ID NO: 5), and a reverse primer was: 5'-AGGGAGGGAGTCCTCCATAA-3' (SEQ ID NO: 6). To amplify BeFLC5_A03, a forward primer was: 5'-ACGCCGAGATAATGCAGAAG-3' (SEQ ID NO: 7), and a reverse primer was: 5'-GTATATTCCGACGCCCTCAA-3' (SEQ ID NO: 8). To amplify BeFLC1_A10, a forward primer was: 5'-CTTCCTGCGAATCTTGTGTG-3' (SEQ ID NO: 9), and a reverse primer was: 5'-TATGCATCACAGCGTGTCAA-3' (SEQ ID NO: 10). To amplify BcFLC2_A02, a forward primer was: 5'-AGGGAAACTAATACAATACGCAA-3' (SEQ ID NO: 11), and a reverse primer was: 5'-GTCGACTCCCTCGTTCAGC-3' (SEQ ID NO: 12). To amplify BeAGL.24_A03, a forward primer was: 5'-TGGCAAAAATTTGGTAACGA-3' (SEQ ID NO: 13), and a reverse primer was: 5'-ATATTGTGCTGCTGCATTGG-3' (SEQ ID NO: 14). To amplify BcFT_A02, a forward primer was: 5'-GACGACAGCTTCGAAAGAGA-3' (SEQ ID NO: 15), and a reverse primer was: 5'-TGAGCATTGTTTTGGTGATG-3' (SEQ ID NO: 16). To amplify BelIM_A08, a forward primer was: 5'-CCAAAAAGCCGAAAAACAGA-3' (SEQ ID NO: 17), and a reverse primer was: 5'-TTTGGAACCACCAAGTTGAA-3' (SEQ ID NO: 18). The specific sequences were set forth in the SEQ ID NO: 1 to SEQ ID NO: 18. The genetic diversity results were shown in FIG. 5. The primers were set according to the genome sequence of CK, which was published in website (http://tbir.njau.edu.cn/NhCCDbHubs/). If the $M_0$ and $M_1$ generations amplified by the primers were different from CK, it indicated that the $M_0$ and $M_1$ generations were mutated.

Figure 5:
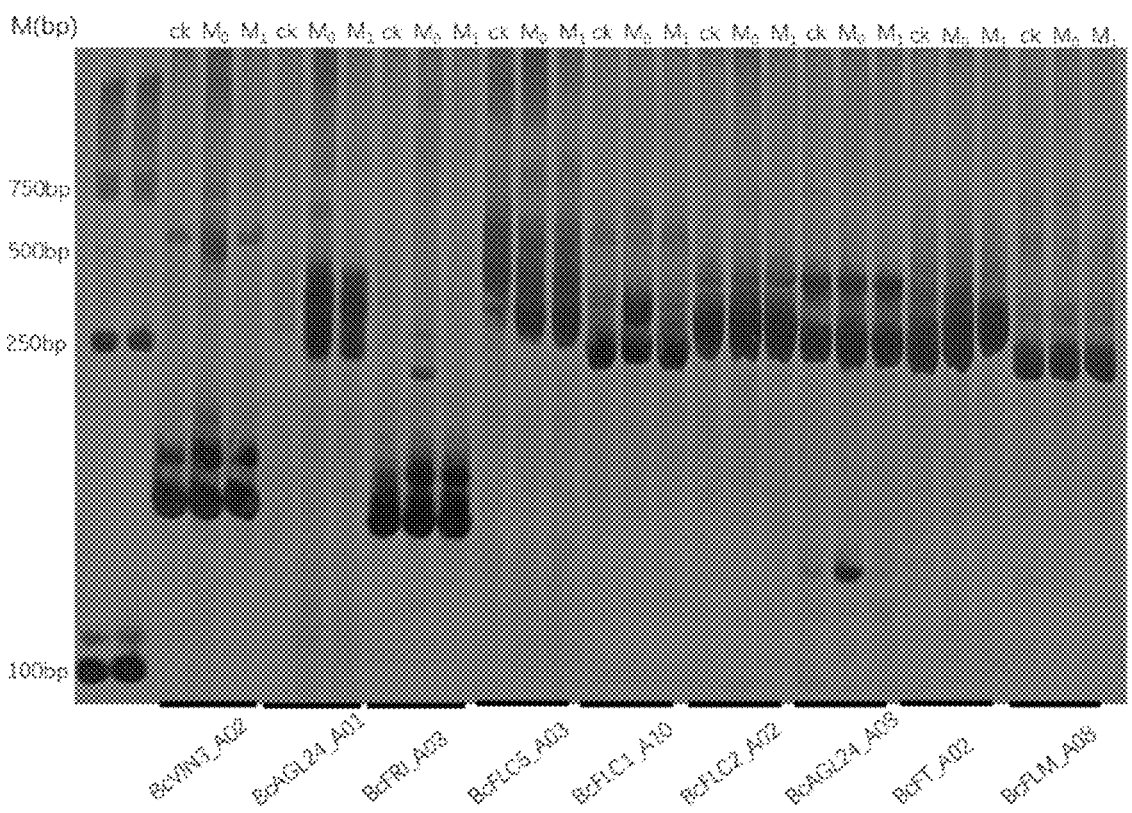
FIG. 5 shows molecular detection results of simple sequence repeat (SSR) markers linked to candidate genes of a flowering time on mutant strains.

As shown in FIG. 5, BcAGL24_A01 and BcFLC5_A03 had obvious marks on $M_0$ and $M_1$ where the size of the PCR product was, while CK had no such marks. The results revealed that plasma mutagenesis of Brassica campestris ssp. chinensis Makino could obtain excellent mutant strains, which could be stably inherited.

As can be seen from the above examples, the present disclosure provides a method for activating a crop seed by HVCP, and use thereof. In the present disclosure, the method can improve the heat resistance and disease resistance of the seeds, and provide a scientific basis for subsequent acquisition of excellent seeds.

The above are merely preferred embodiments of the present disclosure. It should be noted that several improvements and modifications may further be made by those of ordinary skill in the art without departing from the principle of the present disclosure, and such improvements and modifications should also be deemed as falling within the claimed scope of the present disclosure.

What is claimed is:

1. A method for mutagenizing a crop seed by high-voltage electric field cold plasma (HVCP), comprising following steps:
    (1) mixing a crop seed with water and immersing the crop seed in water for 4 h to 8 h to obtain an immersed crop seed; and
    (2) conducting discharge activation by HVCP on the immersed crop seed at a voltage of 130 kV,
    wherein the discharge activation is conducted for 2 h to 4 h, and
    wherein the crop is *Brassica campestris* ssp. *chinensis* Makino.

2. The method according to claim 1, wherein the mixing of the crop seed with the water is conducted at a mass-to-volume ratio of 1:4 to 1:6.

3. The method according to claim 2, wherein the mixing of the crop seed with the water is conducted at a mass-to-volume ratio of 1:5.

4. The method according to claim 1, wherein the immersing is conducted in dark; and the immersing is conducted at a water temperature of 18° C. to 22° C.

5. The method according to claim 4, wherein the immersing is conducted at a water temperature of 20° C.

6. The method according to claim 1, wherein the discharge activation by HVCP is conducted at 18° C. to 25° C.

7. The method according to claim 6, wherein the discharge activation by HVCP is conducted at 20° C.

8. A method for mutation breeding by HVCP comprising following steps:
    (1) mixing a crop seed with water and immersing the crop seed in water for 4 h to 8 h to obtain an immersed crop seed; and
    (2) conduction discharge activation by HVCP on the immerse crop seed at a voltage of 130 kV,
    wherein the discharge activation is conducted for 2 h to 4 h, and
    wherein the crop is *Brassica campestris* ssp. *chinensis* Makino.

* * * * *

SEQUENCE LISTING

```
Sequence total quantity: 18
SEQ ID NO: 1            moltype = DNA  length = 20
FEATURE                 Location/Qualifiers
source                  1..20
                        mol_type = other DNA
                        organism = synthetic construct
SEQUENCE: 1
ccaccagaac tggctctcat                                              20

SEQ ID NO: 2            moltype = DNA  length = 20
FEATURE                 Location/Qualifiers
source                  1..20
                        mol_type = other DNA
                        organism = synthetic construct
SEQUENCE: 2
gagggaggac ctggagttgt                                              20

SEQ ID NO: 3            moltype = DNA  length = 20
FEATURE                 Location/Qualifiers
source                  1..20
                        mol_type = other DNA
                        organism = synthetic construct
SEQUENCE: 3
tctttgtgat gccgatgttg                                              20

SEQ ID NO: 4            moltype = DNA  length = 20
FEATURE                 Location/Qualifiers
source                  1..20
                        mol_type = other DNA
                        organism = synthetic construct
SEQUENCE: 4
gatatctcca agcccgagaa                                              20

SEQ ID NO: 5            moltype = DNA  length = 20
FEATURE                 Location/Qualifiers
source                  1..20
                        mol_type = other DNA
                        organism = synthetic construct
SEQUENCE: 5
ctgatactgc tgctccatcg                                              20

SEQ ID NO: 6            moltype = DNA  length = 20
FEATURE                 Location/Qualifiers
source                  1..20
                        mol_type = other DNA
                        organism = synthetic construct
SEQUENCE: 6
```

```
agggagggag tcctccataa                                              20

SEQ ID NO: 7             moltype = DNA    length = 20
FEATURE                  Location/Qualifiers
source                   1..20
                         mol_type = other DNA
                         organism = synthetic construct SEQUENCE: 7
acgccgagat aatgcagaag                                              20

SEQ ID NO: 8             moltype = DNA    length = 20
FEATURE                  Location/Qualifiers
source                   1..20
                         mol_type = other DNA
                         organism = synthetic construct SEQUENCE: 8
gtatattccg acgccctcaa                                              20

SEQ ID NO: 9             moltype = DNA    length = 20
FEATURE                  Location/Qualifiers
source                   1..20
                         mol_type = other DNA
                         organism = synthetic construct SEQUENCE: 9
cttcctgcga atcttgtgtg                                              20

SEQ ID NO: 10            moltype = DNA    length = 20
FEATURE                  Location/Qualifiers
source                   1..20
                         mol_type = other DNA
                         organism = synthetic construct SEQUENCE: 10
tatgcatcac agcgtgtcaa                                              20

SEQ ID NO: 11            moltype = DNA    length = 23
FEATURE                  Location/Qualifiers
source                   1..23
                         mol_type = other DNA
                         organism = synthetic construct SEQUENCE: 11
agggaaacta atacaatacg caa                                          23

SEQ ID NO: 12            moltype = DNA    length = 19
FEATURE                  Location/Qualifiers
source                   1..19
                         mol_type = other DNA
                         organism = synthetic construct SEQUENCE: 12
gtcgactccc tcgttcagc                                               19

SEQ ID NO: 13            moltype = DNA    length = 20
FEATURE                  Location/Qualifiers
source                   1..20
                         mol_type = other DNA
                         organism = synthetic construct SEQUENCE: 13
tggcaaaaat ttggtaacga                                              20

SEQ ID NO: 14            moltype = DNA    length = 20
FEATURE                  Location/Qualifiers
source                   1..20
                         mol_type = other DNA
                         organism = synthetic construct SEQUENCE: 14
atattgtgct gctgcattgg                                              20

SEQ ID NO: 15            moltype = DNA    length = 20
FEATURE                  Location/Qualifiers
source                   1..20
                         mol_type = other DNA
                         organism = synthetic construct SEQUENCE: 15
gacgacagct tcgaaagaga                                              20

SEQ ID NO: 16            moltype = DNA    length = 20
FEATURE                  Location/Qualifiers
source                   1..20
                         mol_type = other DNA
                         organism = synthetic construct
```

```
SEQUENCE: 16
tgagcattgt tttggtgatg                                                  20

SEQ ID NO: 17         moltype = DNA  length = 20
FEATURE               Location/Qualifiers
source                1..20
                      mol_type = other DNA
                      organism = synthetic construct
SEQUENCE: 17
ccaaaaagcc gaaaaacaga                                                  20

SEQ ID NO: 18         moltype = DNA  length = 20
FEATURE               Location/Qualifiers
source                1..20
                      mol_type = other DNA
                      organism = synthetic construct
SEQUENCE: 18
tttggaacca ccaagttgaa                                                  20
```